US009525996B2

(12) United States Patent
Oommen

(10) Patent No.: US 9,525,996 B2
(45) Date of Patent: Dec. 20, 2016

(54) SYSTEM, TERMINAL, NETWORK ENTITY, METHOD, AND COMPUTER PROGRAM PRODUCT FOR SYSTEM SELECTION IN A MULTI-MODE COMMUNICATION SYSTEM

(75) Inventor: Paul Oommen, Irving, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 2390 days.

(21) Appl. No.: 11/157,613

(22) Filed: Jun. 21, 2005

(65) Prior Publication Data
US 2006/0285538 A1 Dec. 21, 2006

(51) Int. Cl.
H04M 3/42 (2006.01)
H04W 8/18 (2009.01)
H04W 48/18 (2009.01)

(52) U.S. Cl.
CPC ............ H04W 8/183 (2013.01); H04W 48/18 (2013.01)

(58) Field of Classification Search
CPC ..................................................... H04M 3/42
USPC ............ 455/429, 432.1, 435, 436, 437, 439, 446,455/450, 451, 452.1, 452.2; 370/328, 349, 370/352–356, 338; 379/201.01, 201.02, 201.05
See application file for complete search history.

(56) References Cited

U.S. PATENT DOCUMENTS

| | | | | |
|---|---|---|---|---|
| 6,006,106 A * | 12/1999 | Cook et al. | ................ | 455/552.1 |
| 6,985,720 B2 * | 1/2006 | Qu | .................... | H04L 12/5835 455/412.1 |
| 7,046,998 B2 * | 5/2006 | Verma et al. | ................. | 455/418 |
| 7,277,705 B2 * | 10/2007 | Casaccia et al. | .......... | 455/435.1 |
| 7,307,963 B2 * | 12/2007 | Chow et al. | .................. | 370/259 |
| 7,340,262 B1 * | 3/2008 | Gillespie et al. | .......... | 455/456.3 |
| 7,372,826 B2 * | 5/2008 | Dahod et al. | ................. | 370/328 |
| 7,392,034 B2 * | 6/2008 | Westman et al. | ............. | 455/402 |
| 2002/0177466 A1 | 11/2002 | Laurila et al. | | |
| 2004/0022216 A1 * | 2/2004 | Shi | ........................ | H04W 76/02 370/335 |
| 2004/0192313 A1 | 9/2004 | Otting | | |
| 2005/0175021 A1 * | 8/2005 | Ozugur et al. | ................ | 370/401 |
| 2005/0227631 A1 * | 10/2005 | Robinett | ................ | H04B 1/006 455/83 |
| 2005/0243870 A1 | 11/2005 | Balogh et al. | | |
| 2005/0266844 A1 | 12/2005 | Narasimha | | |

(Continued)

FOREIGN PATENT DOCUMENTS

EP 1622315 A1 2/2006
WO WO 2004/056136 A2 7/2004
(Continued)

OTHER PUBLICATIONS

Examination and Search Report, dated Mar. 20, 2009, Malaysian Patent Application No. PI 20062564, filed Feb. 26, 2006.
(Continued)

Primary Examiner — Olisa Anwah
(74) Attorney, Agent, or Firm — Ditthavong & Steiner, P.C.

(57) ABSTRACT

A terminal, network entity, system, method and computer program product enable communications to be established with an available system that is on a priority list and that has a desired service available. Communications may be established automatically with the system that is highest on the priority list and that has the desired service available. Alternatively, all of the systems that are on the priority list and that have the desired service available may be displayed to a user, such that the user may select one of the displayed systems and communications may be established with the selected system.

17 Claims, 3 Drawing Sheets

(56) References Cited

U.S. PATENT DOCUMENTS

| | | | |
|---|---|---|---|
| 2006/0019679 A1* | 1/2006 | Rappaport et al. | 455/456.5 |
| 2007/0171893 A1* | 7/2007 | Xu et al. | 370/352 |
| 2008/0293403 A1* | 11/2008 | Quon et al. | 455/426.1 |
| 2009/0028089 A1* | 1/2009 | Isomaki et al. | 370/328 |
| 2009/0141665 A1* | 6/2009 | Shim | H04L 12/189 370/312 |
| 2010/0040025 A1* | 2/2010 | Karaoguz | H04M 1/725 370/331 |
| 2010/0071053 A1* | 3/2010 | Ansari et al. | 726/12 |

FOREIGN PATENT DOCUMENTS

| | | |
|---|---|---|
| WO | WO 2004 056136 A2 | 7/2004 |
| WO | WO 2006 109124 A2 | 10/2006 |

OTHER PUBLICATIONS

Japanese Office action for corresponding JP application No. 2008-517617 dated Nov. 1, 2010, pp. 1-5.
Taiwanese Office Action for related Taiwanese Patent Application No. 095120420 dated Jun. 21, 2012, pp. 1-7.
Taiwanese Search Report for related Taiwanese Patent Application No. 095120420 dated Jun. 21, 2012, p. 1.
Official Letter for corresponding Taiwanese Application No. 95120420, dated Oct. 22, 2014, 4 pages (English Language Summary Included).
Singapore Search Report and Written Opinion (Australian Search Authority), dated Feb. 25, 2009, for Singapore Application No. 200718022-7.
Japanese Office action for corresponding JP Patent Application No. 2008-517617 dated Aug. 23, 2011, pp. 1-2.

* cited by examiner

SYSTEM, TERMINAL, NETWORK ENTITY, METHOD, AND COMPUTER PROGRAM PRODUCT FOR SYSTEM SELECTION IN A MULTI-MODE COMMUNICATION SYSTEM

FIELD OF THE INVENTION

Embodiments of the invention generally relate to wireless networks, and more particularly to system selection in a multi-mode wireless communication system.

BACKGROUND OF THE INVENTION

Wireless communication systems and networks are used in connection with many applications and devices, including for example, portable communication devices (PCDs) (e.g., cellular telephones), portable digital assistants (PDAs), laptop computers, or any suitable device that is capable of communicating with a wireless network. One significant benefit that wireless communications networks provide to a user of portable communication devices is to allow the user mobility to travel within and between networks.

Many different modes or types of wireless communications systems have been developed. These modes include GSM (Global Systems for Mobile Communication) (which may include WCDMA (Wideband Code Division Multiple Access)), CDMA (Code Division Multiple Access), WLAN (Wireless Local Area Network, based on the IEEE 802.11 standard), UMTS (Universal Mobile Telecommunications System), WiMAX (based on the IEEE 802.16 standard), and the like. Different modes of communication may be provided in different geographic areas or by different communication service providers in the same geographic area. Multi-mode PCDs, which are capable of communicating over two or more different modes of networks, are becoming more common. Because such multi-mode PCDs enable users to communicate with different types of systems, users may therefore be able to communicate in many different geographic areas.

When a user travels to a new geographic area with a PCD, the PCD will typically establish communication with one of the available systems in the new geographic area. Two or more different communication systems with which the PCD may communicate may be available in the new geographic area. As such, the PCD may select one of the communications systems and establish communication with the selected system. The PCD will typically use a predefined method for determining which communication system to select. Typically, each different mode of communication may use a different method for determining which communication system to select. Such methods may use a priority list, such as the Preferred Roaming List (PRL) used in CDMA systems, that is stored in the PCD. The priority list may be arranged by geographic area, and typically comprises a list of systems with which the PCD may establish communications depending on availability of each system. As the PCD enters a new geographic area, the PCD will typically attempt to establish communications with the first system on the priority list. If the first system on the priority list is not available, the PCD will typically attempt to establish communications with the second system on the priority list. The PCD will typically cycle through the priority list, attempting to establish communications with each successive system on the priority list, until the PCD is able to establish communications with one of the systems on the priority list. The systems that are contained in a priority list may vary based on the particular geographic area, the communication service provider for a particular PCD, and the reciprocal agreements between the communication provider for the particular PCD and other communication providers (e.g., roaming agreements). The priority list is typically stored in each PCD, and may be updated via the over-the-air service provision (OTASP). Each method of determining which communication system to select typically has a goal of ensuring basic voice service for the PCD.

When a user of a multi-mode PCD travels to a new geographic area, the multi-mode PCD may be able to establish communications with a number of different systems corresponding to each different mode. For example, the user may have a PCD capable of communicating using GSM, CDMA, and UMTS. There may be several available GSM systems, several available CDMA systems, and several available UMTS systems in the area. Currently, the user would typically need to select which mode the user would prefer to use to establish communications. The PCD would then use the corresponding method of determining with which system to establish communication within the selected mode. There is a proposal to establish what may be termed a mode priority list. The mode priority list may be used by the PCD as an alternative to allowing the user to select the desired mode. The mode priority list may comprise a list of modes that the PCD is capable of using to communicate. The mode priority list would typically indicate the order in which the modes should be used by the PCD to attempt to establish communication. As the PCD attempts to establish communication within one particular mode, the PCD would typically use that mode's method of determining which system to select (e.g., the priority list). In the example multi-mode PCD described above, the mode priority list may indicate that communication should be attempted with CDMA first, then GSM, and finally UMTS. Typically, the PCD would first attempt to establish communications with the systems on the CDMA priority list (i.e., the PRL). If the PCD is unable to establish communications with any of the systems on the CDMA priority list, the PCD would then typically attempt to establish communications with the systems on the GSM priority list, as GSM is the next mode in the mode priority list. If the PCD is unable to establish communications with any of the systems on the GSM priority list, the PCD would then typically attempt to establish communications with the systems on the UMTS priority list, as UMTS is the next mode in the mode priority list. If the PCD is unable to establish communications with any of the systems on the UMTS priority list, the PCD would then typically attempt again with the CDMA priority list. Even under this proposed new method of determining which communication system to select, the goal would typically still be to ensure basic voice service for the PCD.

While basic voice service may be important to PCD users, many other services may be desired by users and provided by many, but not all, communication service providers. Examples of such services include but are not limited to instant messaging (IM), push-to-talk (PTT), multimedia messaging service (MMS), device management, voice over internet protocol (VoIP), and other voice and data services. When a user travels to a new geographic area, the user may desire to continue using a service, such as MMS, that the user was using in the previous geographic area. As such, the user would prefer that the PCD establish communications with a system that is capable of providing the desired service. However, current methods for determining which communication system to select do not consider the availability of desired services.

BRIEF SUMMARY OF THE INVENTION

A terminal, network entity, system, method and computer program product are therefore provided in which communications may be established with an available system that is on a priority list and that has the desired service available. Communications may be established automatically with the system that is highest on the priority list and that has the desired service available. Alternatively, all of the systems that are on the priority list and that have the desired service available may be displayed to a user, such that the user may select one of the displayed systems and communications may be established with the selected system.

In this regard, a terminal for providing flexible system selection in a multi-mode communication system comprises a processor capable of receiving signals from at least two communication systems and establishing communication with one of the communication systems based on respective availability information for at least one desired service from each of the communication systems. The desired service may be selected from the group comprising instant messaging, push-to-talk, multimedia messaging service, device management, and voice over internet protocol (VoIP).

In one exemplary embodiment, the processor receives the respective availability information from the communication systems. In an alternative embodiment, the processor receives respective geographic information from the communication systems, and the processor is further capable of determining the respective availability information for the desired service based on the geographic information.

The terminal may further comprise a storage element capable of accessing at least one system priority list. The system priority list may define respective geographic information for the communication systems, such that the processor is further capable of determining the respective availability information for the desired service based on the geographic information defined in the system priority list.

In one embodiment, the may comprise a storage element capable of accessing the desired service and accessing at least one system priority list. The system priority list may define the respective availability information for the at least one desired service. Alternatively, the processor may be further capable of establishing communication with the communication system that has a highest priority on the system priority list and has the desired service available. In another alternative embodiment, the processor may be further capable of receiving a user communication system selection from among all communication systems that are on the system priority list and that have the desired service available, and then establishing communication with the communication system selected by the user.

In addition to the terminal for providing flexible system selection in a multi-mode communication system as described above, other aspects of the present invention are directed to corresponding network entities, systems, methods and computer program products for providing flexible system selection in a multi-mode communication system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
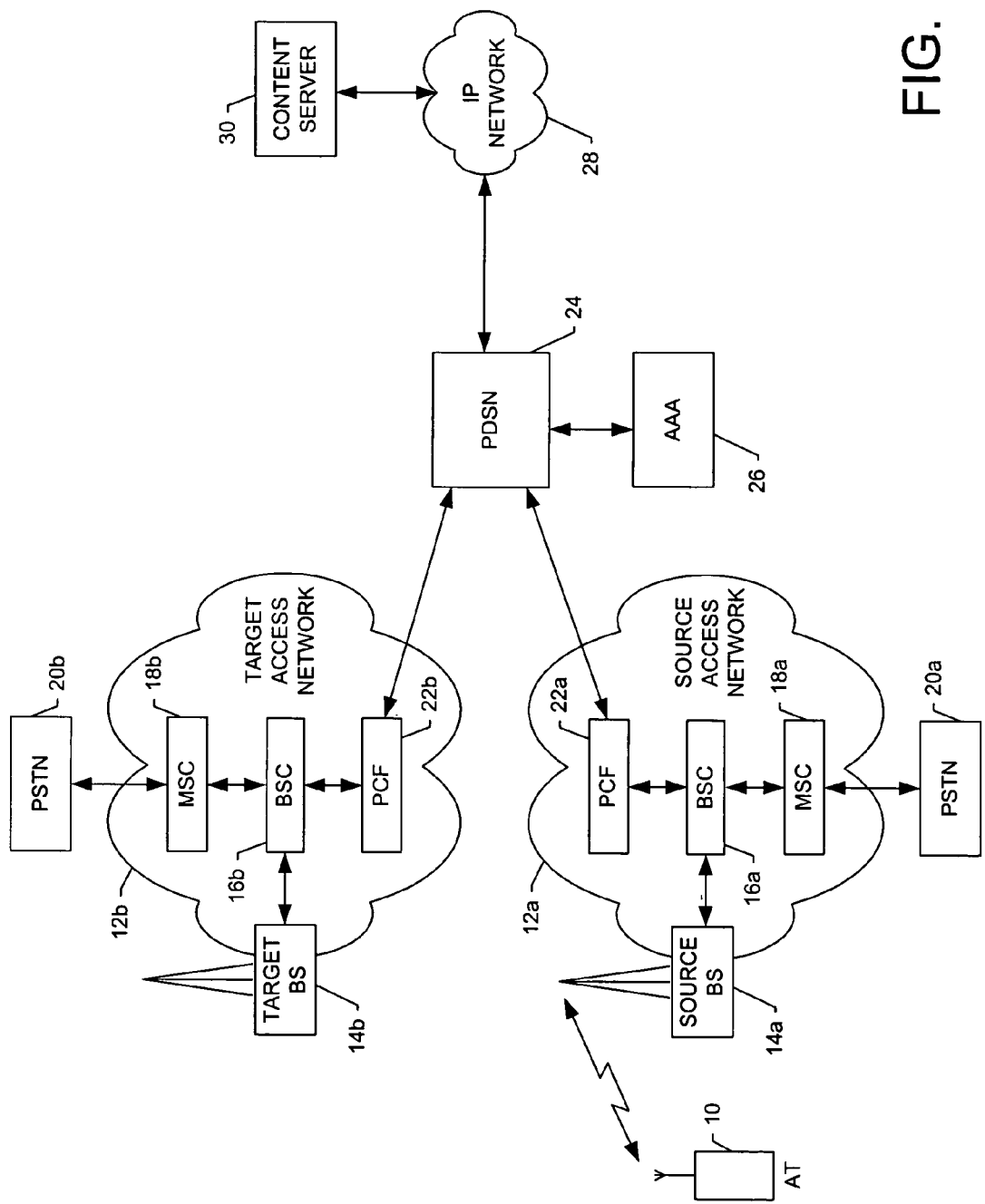
FIG. 1 is a schematic block diagram of one type of system that would benefit from embodiments of the invention.

Referring to FIG. 1, an illustration of one type of system that would benefit from embodiments of the present invention is provided. The system can include one or more access terminals (AT) 10 (also termed terminals or mobile stations), each having an antenna 11 for transmitting signals to and for receiving signals from one or more base transceiver stations (BTS's) 14 (also termed base stations), two of which are shown in FIG. 1 (shown as including a source BTS 14a and a target BTS 14b). The BTS is a part of one or more cellular or mobile networks that each includes elements required to operate the network. The user of the AT 10 may be executing a service such as IM, PTT, or MMS such that the AT is communicating with the source access network 12a. If the user is traveling away from source AN and toward the target access network 12b, the communication with the AT 10 must be handed off from the source AN to the target AN. The service being executed by the AT typically must be available from the target AN if the AT is to continue executing the service.

A BTS acts as the interface between a network and an access terminal, in that the BTS converts digital data into radio signals and converts radio signals into digital data. Each BTS generally has an associated radio tower or antenna and communicates with various access terminals using radio links. In particular, BTSs communicate with various access terminals through the modulation and transmission of sets of forward signals, while BTSs receive and demodulate sets of reverse signals from various access terminals that are engaged in a wireless network activity (e.g., a telephone call, Web browsing session, etc.).

BTSs connect to one or more base station controllers (BSCs) 16 (e.g., using un-channelized T1 facilities or direct cables, although this is not required), two of which are shown in FIG. 1 (shown as including a source BSC 16a and a target BSC 16b). The connection between a BTS and a BSC may use, for example, un-channelized T1 facilities or direct cables. BSCs are used to interface (aggregate) all radio frequency (RF) traffic arriving from the antennas of the BTSs, and to provide this traffic to a mobile switching center 18 (MSC) two of which are shown in FIG. 1 (shown as including a source MSC 18a and a target MSC 18b). As known in the art, BSCs are generally responsible for managing the radio resources for one or more BTSs. For example, BSCs may handle radio-channel setup, frequency hopping, and handovers. Moreover, the MSC is responsible for providing the interface between the radio access network 12 (RAN), which includes BTSs 14, BSCs 16, and packet control functions 22 (PCFs) (including a source PCF 22*a* and a target PCF 22*b*), and a public switched telephone network 20 (PSTN) (including a source PSTN 20*a* and a target PSTN 20*b*). In particular, MSC 18 controls the signaling required to establish calls, and allocates RF resources to BSCs and PCFs. In operation, the MSC is capable of routing calls, data or the like to and from mobile stations when those mobile stations are making and receiving calls, data or the like. The MSC can also provide a connection to landline trunks when mobile stations are involved in a call.

PCFs are used to route IP packet data between access terminals (when within range of one of BTSs) and a packet data service node 24 (PDSN). A PDSN, in turn, may be used to provide access to one or more IP networks 28, such as, for example, the Internet, intranets, applications servers, or corporate virtual private networks (VPNs). In this manner, a PDSN acts as an access gateway. A PDSN generally also acts as a client for an Authentication, Authorization, and Accounting (AAA) server 26. As known in the art, an AAA server may be used to authenticate and authorize access terminals before access is granted to an IP network. Once access is authorized, an access terminal may communicate with a content server 30, which may be capable of providing information and/or services to the access terminal.

Although not every element of every possible network is shown and described herein, it should be appreciated that the access terminal 10 may be coupled to one or more of any of a number of different networks using one or more of any of a number of different modes (also referred to herein as protocols). In this regard, access terminal(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Additionally, one ore more network(s) may be capable of supporting wide area network (WAN) communications, such as WLAN (IEEE 802.11) or WiMAX (802.16). Some narrow-band AMPS (NAMPS), as well as TACS, network(s) may also benefit from embodiments of the present invention, as should dual or higher mode mobile stations (e.g., digital/analog or TDMA/CDMA/analog phones).

Figure 2:
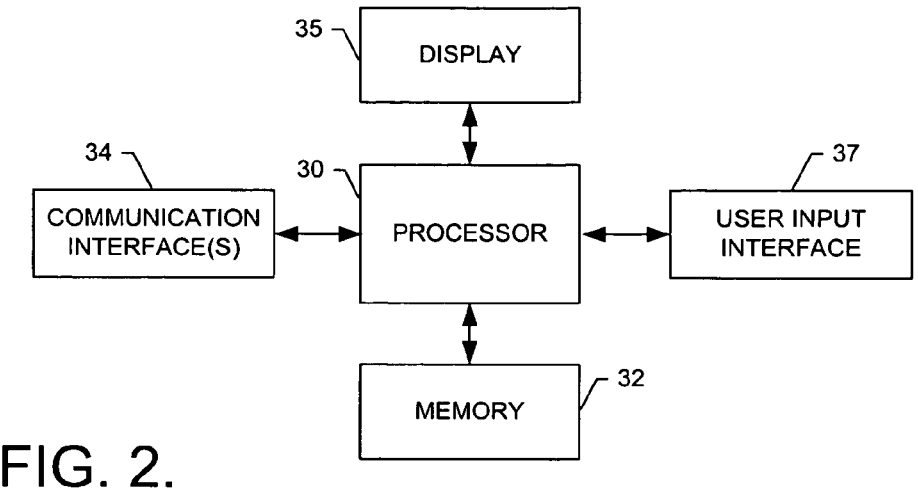
FIG. 2 is a schematic block diagram of an entity capable of operating as a mobile station, terminal, and/or network entity, in accordance with embodiments of the invention.

Referring now to FIG. 2, a block diagram of an entity capable of operating as a mobile station, terminal, and/or network entity is shown in accordance with one embodiment of the invention. The entity capable of operating as a mobile station, terminal, and/or network entity includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can generally include a processor 38 connected to a memory 40. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with embodiments of the present invention. As explained below, for example, the memory can store client application(s) including a configuration utility, content manager and/or display manager. In this regard, when executed, the configuration utility may function to configure a source of content to receive or otherwise provide content. The content manager, when executed, may function to manage the receipt of content from the source, and/or the use of content received from the source. And the display manager may function to manage presentation of content received from the source. As described herein, the client application(s) each comprise software operated by the respective entities. It should be understood, however, that any one or more of the client applications described herein can alternatively comprise firmware or hardware, without departing from the spirit and scope of the present invention.

In addition to the memory 40, the processor 38 can also be connected to at least one interface or other means for displaying, transmitting and/or receiving data, content or the like. In this regard, the interface(s) can include at least one communication interface 42 or other means for transmitting and/or receiving data, content or the like, as well as at least one user interface that can include a display 44 and/or a user input interface 46. The user input interface, in turn, can comprise any of a number of devices allowing the entity to receive data from a user, such as a keypad, a touch display, a joystick or other input device.

Figure 3:
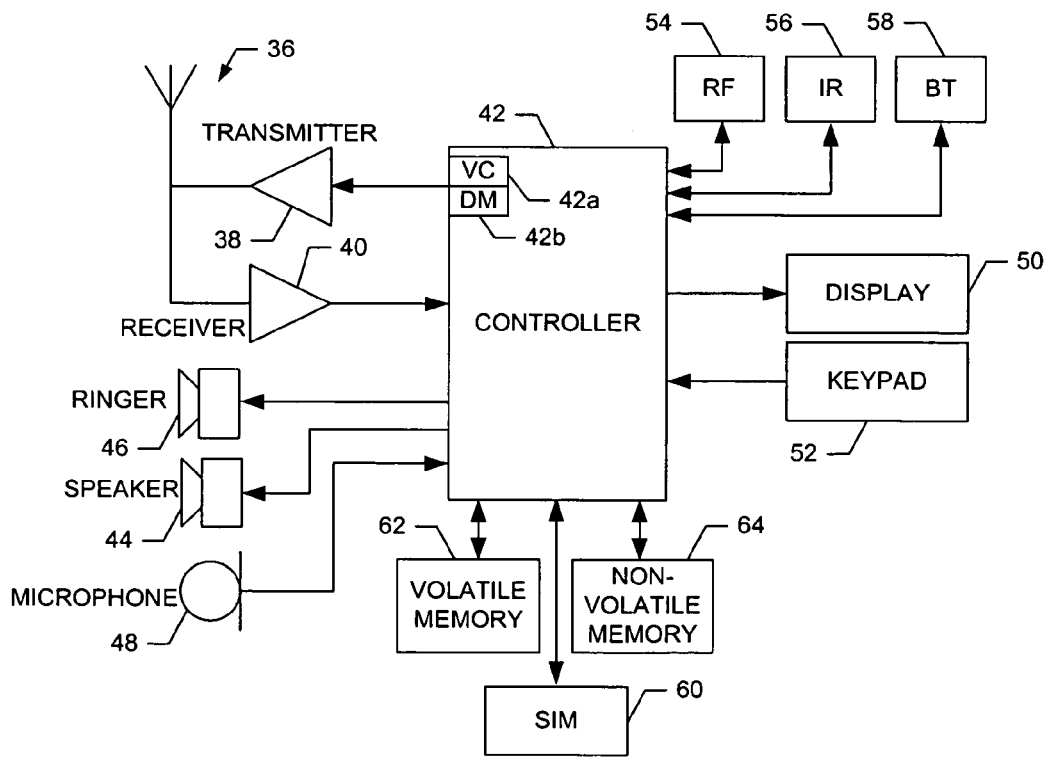
FIG. 3 is a schematic block diagram more particularly illustrating a mobile station or access terminal in accordance with one embodiment of the invention.

Reference is now made to FIG. 3, which illustrates one type of access terminal or mobile station 10, a mobile telephone, which would benefit from embodiments of the present invention. It should be understood, however, that the mobile terminal illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of access terminals or mobile stations, such as portable digital assistants (PDAs), pagers, laptop computers, mobile gaming devices, and other types of electronic systems, can readily employ the present invention.

The terminal 10 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 3, in addition to an antenna 14, the mobile station 10 can include a transmitter 48, receiver 50, and controller 52 or other processor that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, EDGE, or the like. Further, for example, the mobile station may be capable of operating in accordance with 3G wireless communication protocols such as UMTS network employing WCDMA radio access technology. Additionally, the mobile station may be capable of operating in accordance with wide area network (WAN) communication protocols, such as WLAN (IEEE 802.11) or WiMAX (802.16). Some NAMPS, as well as TACS, mobile stations may also benefit from the teaching of this invention, as should dual or higher mode phones (e.g., digital/analog or TDMA/CDMA/analog phones).

It is understood that the controller 52 includes the circuitry required for implementing the audio and logic functions of the mobile station 10. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 52a, and may include an internal data modem (DM) 52b. Further, the controller may include the functionality to operate one or more client software programs such as those indicated above, which may be stored in memory (described below).

The mobile station 10 also comprises a user interface including a conventional earphone or speaker 54, a ringer 56, a microphone 58, a display 60, and a user input interface, all of which are coupled to the controller 52. Although not shown, the mobile station can include a battery for powering the various circuits that are required to operate the mobile station, as well as optionally providing mechanical vibration as a detectable output. The user input interface, which allows the mobile station to receive data, can comprise any of a number of devices allowing the mobile station to receive data, such as a keypad 52, a touch display (not shown), a joystick (not shown) or other input device. In embodiments including a keypad, the keypad includes the conventional numeric (0-9) and related keys (#, *), and other keys used for operating the mobile station.

The mobile station 10 can also include one or more means for sharing and/or obtaining data. For example, the mobile station can include a short-range radio frequency (RF) transceiver or interrogator 64 so that data can be shared with and/or obtained from electronic devices in accordance with RF techniques. The mobile station can additionally, or alternatively, include other short-range transceivers, such as, for example an infrared (IR) transceiver 66, and/or a Bluetooth (BT) transceiver 68 operating using Bluetooth brand wireless technology developed by the Bluetooth Special Interest Group. The mobile station can therefore additionally or alternatively be capable of transmitting data to and/or receiving data from electronic devices in accordance with such techniques.

The mobile station 10 can further include memory, such as a subscriber identity module (SIM) 70, a removable user identity module (R-UIM), a smart card, or the like, which typically stores information elements related to a mobile subscriber. In addition to the SIM, the mobile station can include other removable and/or fixed memory. In this regard, the mobile station can include volatile memory 72, such as volatile Random Access Memory (RAM) including a cache area for the temporary storage of data. The mobile station can also include other non-volatile memory 74, which can be embedded and/or may be removable. The non-volatile memory can additionally or alternatively comprise an EEPROM, flash memory or the like. The memories can store any of a number of software applications, instructions, pieces of information, and data, used by the mobile station to implement the functions of the mobile station.

As will be appreciated, a number of the entities of the system of FIG. 1 can be configured in any of a number of different architectures to perform any of a number of functions. For example, the entities of the system of FIG. 1 can be configured in a centralized client-server architecture, decentralized architecture and/or proxy architecture. Additionally or alternatively, for example, the entities of the system of FIG. 1 can be configured in an architecture given in the Scalable Network Application Package (SNAP) (formerly Sega Network Application Package) provided by Nokia Corporation for applications such as in the context of gaming.

Figure 4:
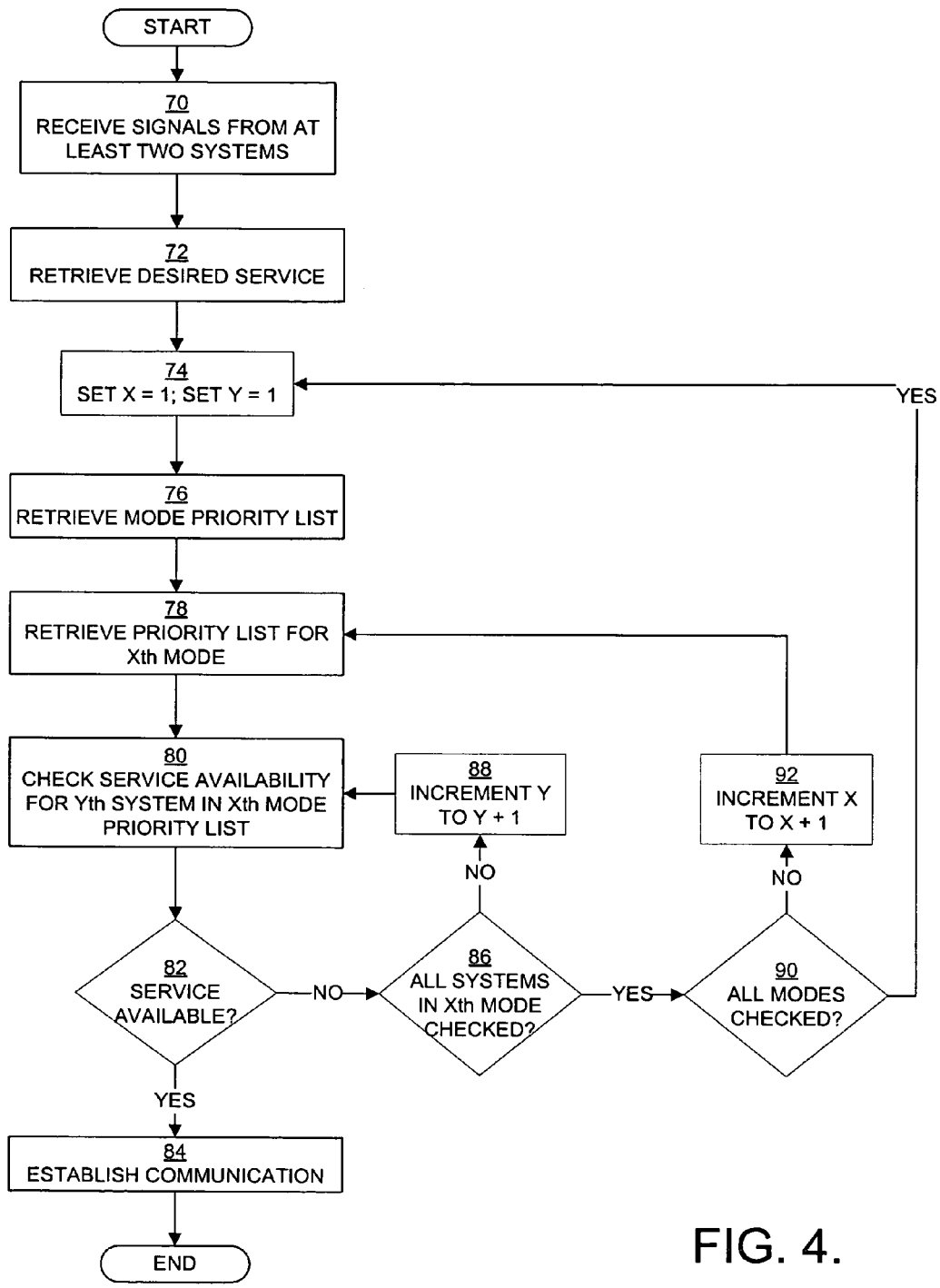
FIG. 4 is a flowchart illustrating system selection in a multi-mode communication system, in accordance with one embodiment of the invention.

Referring now to FIG. 4, a flowchart illustrating system selection in a multi-mode communication system is presented, in accordance with one exemplary embodiment of the invention. In the embodiment illustrated in FIG. 4, communication may be established with an available system that is on a priority list and that has the desired service available. The desired service is typically some telecommunication feature, other than standard voice communication, to which the user has subscribed with a communication service provider. Examples of such services include but are not limited to instant messaging (IM), push-to-talk (PTT), multimedia messaging service (MMS), device management, voice over internet protocol (VoIP), and other voice and data services. Communications may be established automatically with the system that is highest on the priority list and that has the desired service available. In this regard, a system is considered to be highest on the priority list in instances in which the system has the greatest priority, i.e., has a priority greater than that of any other system on the priority list. A terminal, such as access terminal 10 of FIG. 1, may receive signals from at least two communication systems. See block 70. The communication systems may be operating in accordance with different communication protocols or modes. For example, the terminal may receive a signal from one system operating in accordance with the GSM protocol (e.g., one mode) and may receive a signal from another system operating in accordance with the CDMA protocol (e.g., another mode).

The terminal may then retrieve the desired service. See block 72. The desired service is typically stored in memory in the terminal, such as in the subscriber identity module 60 of FIG. 3. The flowchart of FIG. 4 illustrates establishing communication by a terminal capable of communicating via X different modes and having a priority list comprising Y systems for each of the X modes (the value of Y may vary for each of the X modes). As shown in block 74, X is set to 1 and Y is set to 1, so that the availability of the desired service can be determined (as discussed below) for the first system in the priority list for the first mode. The terminal may have a mode priority list stored in memory, as well as a system priority list for each of the modes which the terminal is capable of using to communicate. As discussed above, the mode priority list may comprise a list of modes that the terminal is capable of using, in the order in which the modes should be used by the terminal to attempt to establish communication. The mode priority list may be retrieved from memory (see block 76), and the system priority list for the first mode in the mode priority list may be retrieved from memory (see block 78). If the terminal is receiving a signal from the first system in the first mode, such that the terminal is capable of establishing communication with that system, the terminal would typically determine if the desired service is available from that system. See block 80. The terminal may receive information from the system regarding the availability of the desired service. For example, the system may include information regarding the service(s) supported by the system in a broadcast message transmitted by the system, such as by using a bit map technique to embed service availability information in the broadcast message. Alternatively, the availability of services may be defined by the system priority list that may have been provisioned over the air to the terminal and stored in memory. Alternatively, the terminal may receive geographic information from the system, typically embedded in a broadcast message, such that the terminal may determine the availability information for the desired service based on the geographic information. The terminal would typically use a stored reference table containing information as to which services are available in which geographic area. Alternatively, the terminal could access a reference table stored by a network entity, such as a proxy server or the like. In one exemplary embodiment, the geographic information may be defined by the system priority list that is stored in memory such that the terminal may determine the availability information for the desired service based on the geographic information defined by the priority list.

If the terminal determines in block 82 that the desired service is available from the first system in the priority list of the first mode, then the terminal may establish communication with that system. See block 84. The terminal may automatically establish communication with the first system on the system priority list that the terminal determines has the desired service available. Alternatively, the terminal may determine all of the systems that are available for communication and that have the desired service available, and may display a list of all such services to the user. The user may then select a system from the list, and the terminal may establish communication with the selected system.

If the terminal determines in block 82 that the first system in the priority list of the first mode does not have the desired service available, the terminal determines if there are other systems in the priority list for the first mode that have not been checked for availability of the desired service. See block 86. If not all systems in the priority list of the first mode have been checked for availability of the desired service, the terminal would typically increment Y to Y+1 in block 88, such that the second (i.e., the Y+1) system in the priority list of the first mode may be checked in block 80 for availability of the desired service. Blocks 80 through 88 would typically continue to be executed until a system is determined to have the desired service available or until all systems in the priority list of the first mode have been checked for availability of the desired service. If all systems in the priority list of the first mode have been checked for availability of the desired service, the terminal would typically determine if all modes in the mode priority list have been checked. See block 90. If not all modes in the mode priority list have been checked, as determined in block 90, then the terminal would typically increment X to X+1 in block 92. The terminal may then retrieve the priority list for the second (i.e., the X+1) mode. See block 78. The terminal would then typically continue to execute blocks 80 through 88 until a system is determined to have the desired service available or until all systems in the priority list of the second mode have been checked for availability of the desired service. Blocks 78 through 92 would typically continue to be executed by the terminal until a system is determined to have the desired service available or until all systems in the priority lists of all modes have been checked for availability of the desired service.

If all systems in the priority lists of all modes have been checked for availability of the desired service and the desired service is not available, the terminal may reset X and Y to 1, and continue to execute blocks 74 through 92 until a system is determined to have the desired service available and the terminal establishes communication with such a system. Alternatively, the terminal may disregard availability of the desired service and establish communication, using the mode priority list and the system priority lists for each mode, with an available system capable of basic voice service. The determination of whether to continue searching for a system having availability of the desired service or to instead establish communication with an available system capable of basic voice service may be predefined in the terminal, or the user may be allowed to select between the two alternatives.

While FIG. 4 illustrates an embodiment of the invention in which the terminal determines the availability of one desired service and uses that availability to determine which system to establish communications with, other embodiments of the invention may enable the terminal to determine the availability of more than one desired service and use that availability information. For example, the user may subscribe to PTT and MMS services and may desire to connect with systems that have both services available. Such an embodiment would typically function similarly to the embodiment illustrated in FIG. 4, however in block 72 the terminal would typically retrieve all of the desired services and in block 80 the terminal would check for availability of all of the desired services. The terminal may establish communications with a system that has availability of all the desired services. Alternatively, if the terminal cannot identify a system that has availability of all the desired services, the terminal may use a prioritized list of desired services and establish communication with the system that has availability of the highest service on the prioritized list. In another alternative, the available services may be displayed to the user and the user may select which available service the user would prefer to use. The terminal would then typically establish communication with the system having the highest priority that has availability of the user selected service.

According to one exemplary aspect of the present invention, the functions performed by one or more of the entities of the system, such as the terminal 10, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIG. 4 is a flowchart of a system, method and program product according to exemplary embodiments of the present invention. It will be understood that each block or step of the flowcharts, and combinations of blocks in the flowcharts, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, while the terminal is described to store various data, information or the like, the data, information or the like could, instead, be stored by a network entity, such as a proxy server, that is accessible by the terminal. Although specific terms are employed herein, they are used in a generic and descriptive sense only and not for purposes of limitation.

What is claimed is:

1. An apparatus comprising:
   at least one processor; and
   at least one memory including computer program code for one or more programs,
   the at least one memory and the computer program code configured to, with the at least one processor, cause the apparatus to perform at least the following:
   receive signals and respective geographic information from a plurality of communication systems;
   receive information regarding at least one desired service;
   determine the availability of the at least one desired service at each of the plurality of communication systems based on the geographic information; and
   establish communications with at least one of the plurality of communication systems having available each of the at least one desired service.

2. The apparatus of claim 1, wherein the apparatus is further caused to select the at least one desired service from instant messaging, push-to-talk, multimedia messaging service, device management, voice over internet protocol, or a combination thereof.

3. The apparatus of claim 1, further comprising a storage element configured to access at least one system priority list, wherein the at least one system priority list defines the respective geographic information for the plurality of communication systems, and wherein the apparatus is further caused to determine the respective availability information for the at least one desired service based on the geographic information defined in the at least one system priority list.

4. The apparatus of claim 1, further comprising a storage element configured to access the at least one desired service and access at least one system priority list, wherein the at least one system priority list defines the respective availability information for the at least one desired service.

5. The apparatus of claim 1, further comprising a storage element configured to access the at least one desired service and access at least one system priority list, wherein the apparatus is further caused to communicate with the at least one communication system that has a highest priority on the system priority list and has each of the at least one desired service available.

6. An apparatus comprising
   at least one processor, and
   at least one memory including computer program code for one or more programs,
   the at least one memory and the computer program code configured to, with the at least one processor, cause the apparatus to perform at least the following:
   receive signals from a plurality of communication systems;
   receive information regarding at least one desired service;
   access the at least one desired service;
   access at least one system priority list;
   determine the availability of the at least one desired service at each of the plurality of communication systems;
   receive a user communication system selection among all communication systems that are on the system priority list and that have the at least one desired service available; and
   communicate with the communication system selected by the user.

7. An apparatus comprising:
   at least one processor; and
   at least one memory including computer program code for one or more programs,
   the at least one memory and the computer program code configured to, with the at least one processor, cause the apparatus to perform at least the following:
   select at least one desired service;
   transmit signals from a plurality of communication systems to a terminal system, wherein each of the signals comprises availability information for the at least one desired service; and
   establish communications between the terminal system and at least one of the plurality of communication systems having available each of the at least one desired service.

8. The apparatus of claim 7, wherein the apparatus is further caused to select the at least one desired service from instant messaging, push-to-talk, multimedia messaging service, device management, voice over internet protocol, or a combination thereof.

9. The apparatus of claim 7, wherein the apparatus is further caused to establish communications between the at least two communication systems and the terminal based on a system priority list accessible by the terminal and the availability information.

10. A method comprising:
receiving, by an apparatus, signals and respective geographic information from a plurality of communication systems;
receiving, by the apparatus, information regarding at least one desired service;
determining, by the apparatus, the availability of the at least one desired service at each of the plurality of communication systems based on the geographic information; and
establishing, by the apparatus, communications with at least one of the plurality of communication systems having available each of the at least one desired service.

11. The method of claim 10, wherein the at least one desired service is selected from instant messaging, push-to-talk, multimedia messaging service, device management, voice over internet protocol, or a combination thereof.

12. The method of claim 10, further comprising:
accessing at least one system priority list, wherein the system priority list defines the respective geographic information for the plurality of at least two communication systems; and
determining the respective availability information for the at least one desired service based on the geographic information defined in the at least one system priority list.

13. The method of claim 10, further comprising:
accessing the at least one desired service; and
accessing at least one system priority list, wherein the at least one system priority list defines the respective availability information for the at least one desired service.

14. The method of claim 10, further comprising:
accessing the at least one desired service;
accessing at least one system priority list; and
facilitating communications with the at least one communication system that has a highest priority on the system priority list and has each of the at least one desired service available.

15. A method comprising:
receiving, by an apparatus, signals from a plurality of communication systems;
receiving, by the apparatus, information regarding at least one desired service;
accessing, by the apparatus, the at least one desired service;
accessing, by the apparatus, at least one system priority list;
determining, by the apparatus, the availability of the at least one desired service at each of the plurality of communication systems;
receiving, by the apparatus, a user communication system selection among all communication systems that are on the system priority list and that have the at least one desired service available; and
communicating, by the apparatus, with the communication system selected by the user.

16. The apparatus of claim 1, wherein the signals comprise a first signal corresponding with a first protocol and transmitted from a first communication system of the at least two communication systems, and a second signal corresponding with a second communication protocol and transmitted from a second communication system of the two communications systems.

17. The method of claim 10, wherein the signals comprise a first signal corresponding with a first protocol and transmitted from a first communication system of the at least two communication systems, and a second signal corresponding with a second communication protocol and transmitted from a second communication system of the two communications systems.

* * * * *